United States Patent
Grant et al.

(10) Patent No.: US 8,249,518 B2
(45) Date of Patent: Aug. 21, 2012

(54) NETWORK CONTROLLED FEEDBACK FOR MIMO SYSTEMS

(75) Inventors: Stephen J. Grant, Cary, NC (US); Jung-Fu Cheng, Cary, NC (US); Yi-Pin Eric Wang, Cary, NC (US); Karl J. Molnar, Cary, NC (US); Leonld Krasny, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1854 days.

(21) Appl. No.: 11/254,172

(22) Filed: Oct. 19, 2005

(65) Prior Publication Data
US 2006/0079221 A1 Apr. 13, 2006

Related U.S. Application Data

(63) Continuation-in-part of application No. 10/747,752, filed on Dec. 29, 2003, now Pat. No. 7,599,698.

(51) Int. Cl.
*H04B 7/00* (2006.01)
*H04W 72/02* (2009.01)

(52) U.S. Cl. ...................................... 455/69; 455/452.2

(58) Field of Classification Search ............... 455/452.2, 455/445, 452.1, 453, 450, 451, 562.1, 575.7
See application file for complete search history.

(56) References Cited

U.S. PATENT DOCUMENTS

| | | | |
|---|---|---|---|
| 2002/0177447 A1* | 11/2002 | Walton et al. | 455/452 |
| 2003/0123396 A1 | 7/2003 | Seo et al. | |
| 2003/0161282 A1 | 8/2003 | Medvedev et al. | |
| 2005/0002467 A1 | 1/2005 | Seo et al. | |
| 2005/0085195 A1 | 4/2005 | Tong et al. | |
| 2005/0143084 A1 | 6/2005 | Cheng et al. | |
| 2005/0181739 A1 | 8/2005 | Krasny et al. | |
| 2005/0195889 A1 | 9/2005 | Grant et al. | |
| 2005/0207367 A1* | 9/2005 | Onggosanusi et al. | 370/315 |

FOREIGN PATENT DOCUMENTS

| | | |
|---|---|---|
| CN | 1529950 A | 9/2004 |
| EP | 1 304 900 A2 | 4/2003 |
| EP | 1478105 | 11/2004 |
| EP | 1 662 686 | 5/2006 |
| SE | 0400370-3 | 2/2004 |
| WO | WO 99/43178 | 8/1999 |
| WO | WO 00/41339 | 7/2000 |
| WO | WO 00/70897 | 11/2000 |
| WO | 02093782 A1 | 11/2002 |

(Continued)

OTHER PUBLICATIONS

Stephen Grant, Jung-Fu Cheng, Leonid Krasny, Karl Molnar, and Y.-P. Eric Wang, "Per-Antenna-Rate-Control (PARC) in Frequency Selective Fading with SIC-GRAKE Receiver," 2004 IEEE, pp. 1458-1462.

(Continued)

*Primary Examiner* — Nick Corsaro
*Assistant Examiner* — Tangela T. Chambers
(74) *Attorney, Agent, or Firm* — Coats & Bennett, P.L.L.C.

(57) ABSTRACT

In a selective MIMO system, the mobile station provides channel quality feedback for one or more possible transmission mode. The mobile station provides channel quality feedback for a first mode regardless of channel conditions and determines whether to provide feedback for one or more additional modes based on current channel conditions.

30 Claims, 7 Drawing Sheets

FOREIGN PATENT DOCUMENTS

WO WO 2005/032154 4/2005

OTHER PUBLICATIONS

U.S. Appl. No. 10/841,911, filed May 7, 2004, Grant et al.

M.K. Varanasi and T. Guess, "Optimum decision feedback multiuser equalization with successive decoding achieves the total capacity of the Gaussian multiple-access channel," *Proc. Assilomar Conf. on Signals, Systems, and Computers*, Monteray, CA, Nov. 1997, pp. 1405-1409.

S.T. Chung, A. Lozano, and H.C. Huang, "Approaching eigenmode BLAST channel capacity using V-Blast with rate and power feedback," *Proc. IEEE VTC'01-Fall*, Atlantic City, NJ, Oct. 2001, pp. 915-919.

S. Grant, J.-F. T. Cheng, L. Krasny, K. Molnar, and Y.-P. E. Wang, "Per-Antenna-Rate-Control (PARC) in frequency selective fading with SIC-GRAKE receiver," *Proc. IEEE VTC'04-Fall*, Los Angeles, CA, Sep. 2004, 5 pages.

D. Gesbert and M.-S. Alouini, "How much feedback is multi-user diversity really worth." *Proc. IEEE ICC'04*, Paris, Jun. 2004, pp. 234-238.

3GPP TS 25.214 V5.3.0 (Dec. 2002); $3^{rd}$ Generation Partnership Project; Technical Specification Group Radio Access Network; Physical Layer Procedures (FDD) (Release 5); 3GPP; (63 pages).

S. Parkvall, J. Peisa, A. Furuskar, M. Samuelsson and M. Persson, "Evolving WCDMA for Improved High Speed Mobile Internet," Ericsson Research, 5 pages.

Heath et al., "Multimode Antenna Selection for Spatial Multiplexing Systems with Linear Receivers," IEEE Transactions on Signal Processing, Aug. 2005, pp. 3042-3056, vol. 53, No. 8.

\* cited by examiner

NETWORK CONTROLLED FEEDBACK FOR MIMO SYSTEMS

This application is a continuation-in-part claiming priority from U.S. patent application Ser. No. 10/747,752 filed 29 Dec. 2003 now U.S. Pat. No. 7,599,698, which is incorporated herein by reference.

BACKGROUND OF THE INVENTION

The present invention relates to multiple-input, multiple output (MIMO) communication systems, and more particularly, to a method and apparatus for limiting feedback in MIMO systems.

In recent years, there has been much interest in multiple input, multiple output (MIMO) systems for enhancing data rates in the High Speed Downlink Packet (HSDPA) channel in a WCDMA system. MIMO systems employ multiple antennas at the transmitter and receiver to transmit and receive information. The receiver can exploit the spatial dimensions of the signal at the receiver to achieve higher spectral efficiency and higher data rates without increasing bandwidth. One MIMO architecture that is attracting significant attention is the Per Antenna Rate Control (PARC) architecture. In PARC systems, information to be transmitted is divided into multiple streams. Each stream is independently encoded and modulated, and then transmitted from a respective transmit antenna. The coding rates depend on the signal to interference plus noise ratio (SINR). At the receiver, successive interference cancellation (SIC) is used to successively decode each stream.

In conventional PARC systems, the number of transmit antennas is fixed and all transmit antennas are used all the time to transmit data to mobile stations. However, there is no one antenna configuration that is best for all possible operating conditions. There may be circumstances where using less than all transmit antennas is more favorable. For example, it may be desirable to use less than all transmit antennas when the signal to noise ratio of the communication channel is low, when the communication channel is highly dispersive, when large correlations across antennas are present, and when the receiver has fewer antennas than the transmitter. Also, the number and mix of users may affect the antenna selection. In general, performance can be improved by selectively choosing the transmit antennas for a particular transmission mode based on conditions of the communication channel, mix of users, and/or receiver configuration. This process is referred to herein as antenna selection.

For the HSPDA channel in WCDMA systems, it is preferable that the base station control the antenna selection, because the base station has knowledge of the resource allocation that will be used at the time of scheduling. Further, only the base station has knowledge of the data queued for each user, which also affects the antenna selection. Performing antenna selection at the base station, however, requires feedback of the channel conditions from the mobile stations to the base station, where the amount of channel feedback is proportional to the number of users. When a large number of users are present, the amount of feedback may be excessive and adversely affect the quality and reliability of other uplink channels. Therefore, it is desirable to minimize as much as possible the amount of feedback without sacrificing performance.

SUMMARY OF THE INVENTION

The present invention provides a method and apparatus for controlling the amount of channel quality feedback in a mobile communication network, including but not limited to MIMO systems employing antenna selection. The transmitting station (typically the base station) determines the transmission mode, i.e., the number of transmitted information streams, and the receiving station (typically the mobile station) determines the antenna selection for each mode. The receiving station provides channel quality feedback to the transmitting station to enable the scheduler at the base station to schedule one or more receiving stations.

A feedback control mechanism is implemented at the base station to control the feedback load. The mobile stations send channel quality feedback for a first transmission mode regardless of channel conditions. Channel quality feedback for higher order modes is dependent upon current channel conditions. The feedback control according to the present invention may be implemented through use of a threshold that can be revised by the base station to control the feedback load. The threshold may be transmitted to the mobile stations over a broadcast channel that is monitored by all of the mobile stations. Based on the threshold received from the base station, the mobile station determines whether to send channel quality feedback to the base station for the higher order transmission modes.

DETAILED DESCRIPTION OF THE INVENTION

Figure 1:
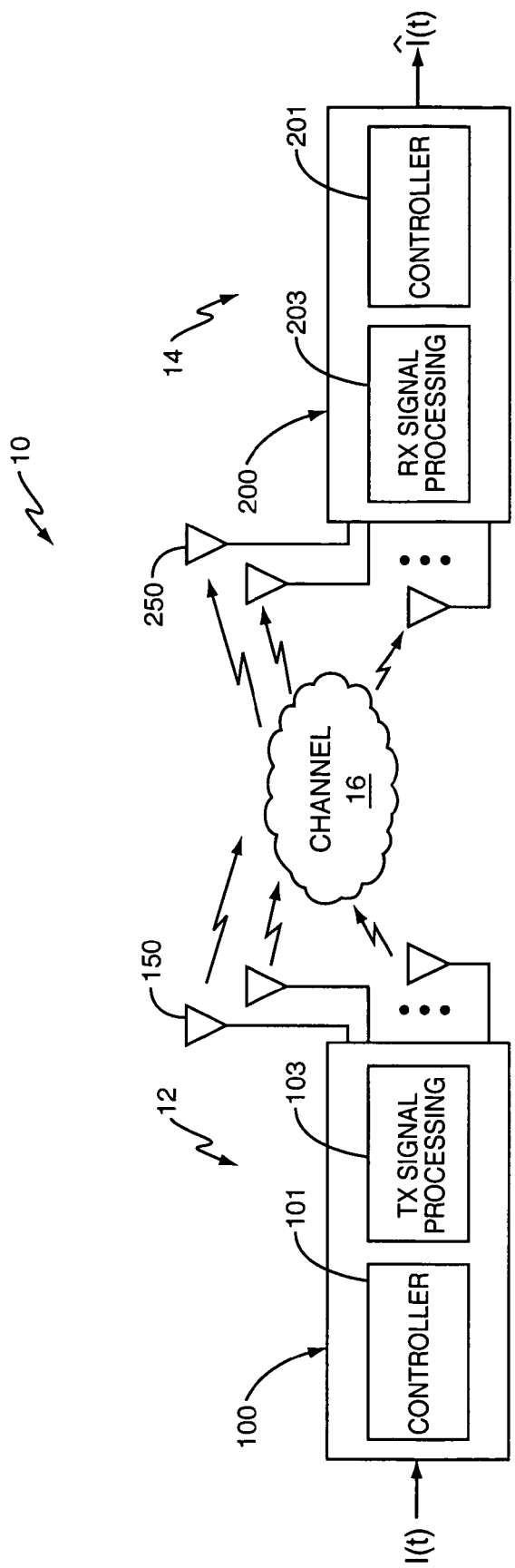
FIG. 1 illustrates a multiple input, multiple output (MIMO) communication system.

FIG. 1 illustrates a multiple input/multiple output (MIMO) wireless communication system 10 including a first station 12 and a second station 14. The first station 12 includes a transmitter 100 for transmitting signals to the second station 14 over a communication channel 16, while the second station includes a receiver 200 for receiving signals transmitted by the first station 12. Those skilled in the art will appreciate that the first station 12 and second station 14 may each include both a transmitter 100 and receiver 200 for bi-directional communications. In one exemplary embodiment, the first station 12 is a base station in a wireless communication network, and the second station 14 is mobile station. The present invention is particularly useful for transmitting data from the base station 12 to the mobile station 14 on the High Speed Downlink Packet Access (HSPDA) channel in WCDMA systems.

An information signal I(t) in the form of a binary data stream is input to the transmitter 100 at the first station 12. The transmitter includes a controller 101 and a transmit signal processing circuit 103. The controller 101 controls operation of the transmitter 100 and schedules mobile stations 14 to receive data on shared downlink channels. The transmit signal processing circuit 103 performs error coding, maps the input bits to complex modulation symbols, and generates transmit signals for each transmit antenna 150, which may be independent, partially redundant, or fully redundant. After upward frequency conversion, filtering, and amplification, transmitter 100 transmits the transmit signals from respective transmit antennas 150 through the communication channel 16 to the mobile station 14. In the exemplary embodiments described herein, the available transmit power is allocated evenly among all active transmit antennas 150.

The receiver 200 at the second station 14 demodulates and decodes the signals received at each antenna 250. Receiver 200 includes a controller 201 to control operation of the receiver 200 and a receive signal processing circuit 203. The receive signal processing circuit 203 demodulates and decodes the signal transmitted from the first station 12. In the absence of bit errors, the output signal from the receiver 200 will be the same as the original information signal input I(t) at the transmitter 100. The receiver 200 may for example, comprise a successive interference cancellation (SIC) receiver that successively decodes a plurality of signals contained within a composite signal. Because multiple data streams are transmitted in parallel from different antennas 150, there is a linear increase in throughput with every pair of antennas 150, 250 added to the system without an increase in the bandwidth requirement. MIMO systems have been the subject of extensive research activity worldwide for use in wireless communication networks because of their potential to achieve high spectral efficiencies, and therefore high data rates.

Figure 2:
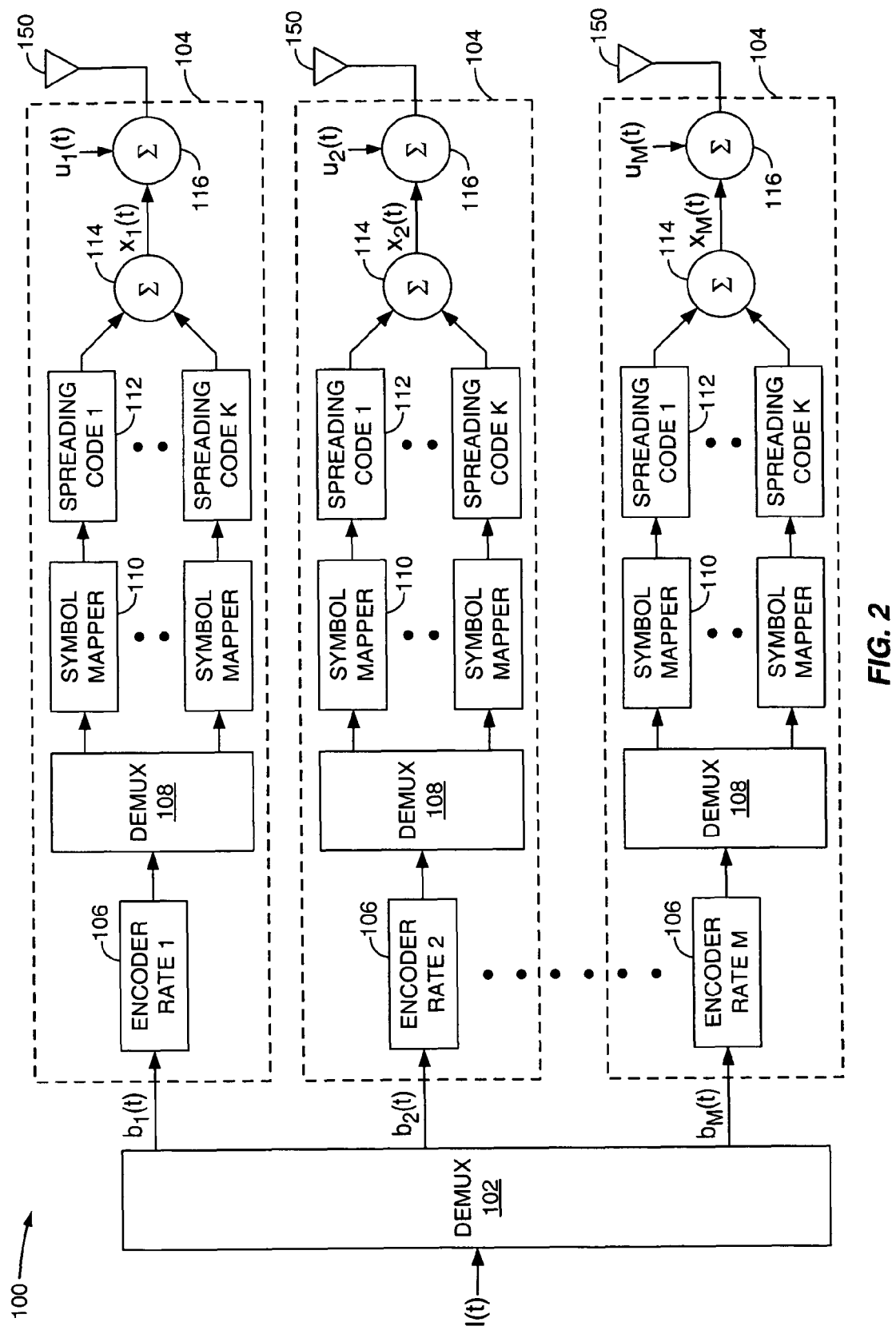
FIG. 2 illustrates a transmitter for a MIMO communication system in a first exemplary embodiment.

FIG. 2 illustrates an exemplary transmitter 100 for a MIMO system based on a Per Antenna Rate Control (PARC) architecture. PARC is a multiple stream transmitting technique used in wireless communication systems to increase system capacity. The transmitter 100 comprises a demultiplexer 102 to divide the original information bit stream I into M bit streams $\{b_1(t), b_2(t), \ldots b_M(t)\}$, coding and modulation circuits 104 for each bit stream, and a plurality of antennas 150. The coding and modulation circuit 104 for each bit stream $\{b_1(t), b_2(t), \ldots b_M(t)\}$ comprises an encoder 106 to encode the bit stream $\{b_1(t), b_2(t), \ldots b_M(t)\}$, a plurality of demultiplexers 108 to further divide the bit stream $\{b_1(t), b_2(t), \ldots b_M(t)\}$ into substreams, a plurality of symbol mappers 110 to map each substream to points on a signaling constellation, a plurality of signal spreaders 112 to apply a selected spreading code to each substream, and a combiner 114 to recombine the sub-streams to generate a transmit signal $\{x_1(t), x_2(t), \ldots x_M(t)\}$ for transmission. The transmit signals $\{x_1(t), x_2(t), \ldots x_M(t)\}$ may be further combined by combiner 116 with one or more other simultaneously transmitted signals $u_m(t)$ that contain a number of dedicated channels and control channels, as well as a common pilot channel. The encoders 106 for each bit stream $\{b_1(t), b_2(t), \ldots b_M(t)\}$ encode the original information bits at different rates. The rates depend on the channel quality indicator (CQI) feedback from the receiver 200. The coded signal output by each encoder 106 is then divided into K substreams by demultiplexers 108. Each sub-stream is mapped to symbols by one of K symbol mappers 110, and spread with one of K spreading codes by signal spreaders 112. The K spreading codes may be reused for the different modulation circuits 104. The combiner 114 recombines the K spread signals from each signal spreader 112. In the PARC approach shown in FIG. 2, the number of coded signals and the number of transmit antennas 150 are the same. However, the number of used transmit antennas 150 may vary from one scheduling interval to the next. Furthermore, the subset of used transmit antennas 150 can be optimized by using antenna selection.

Figure 3:
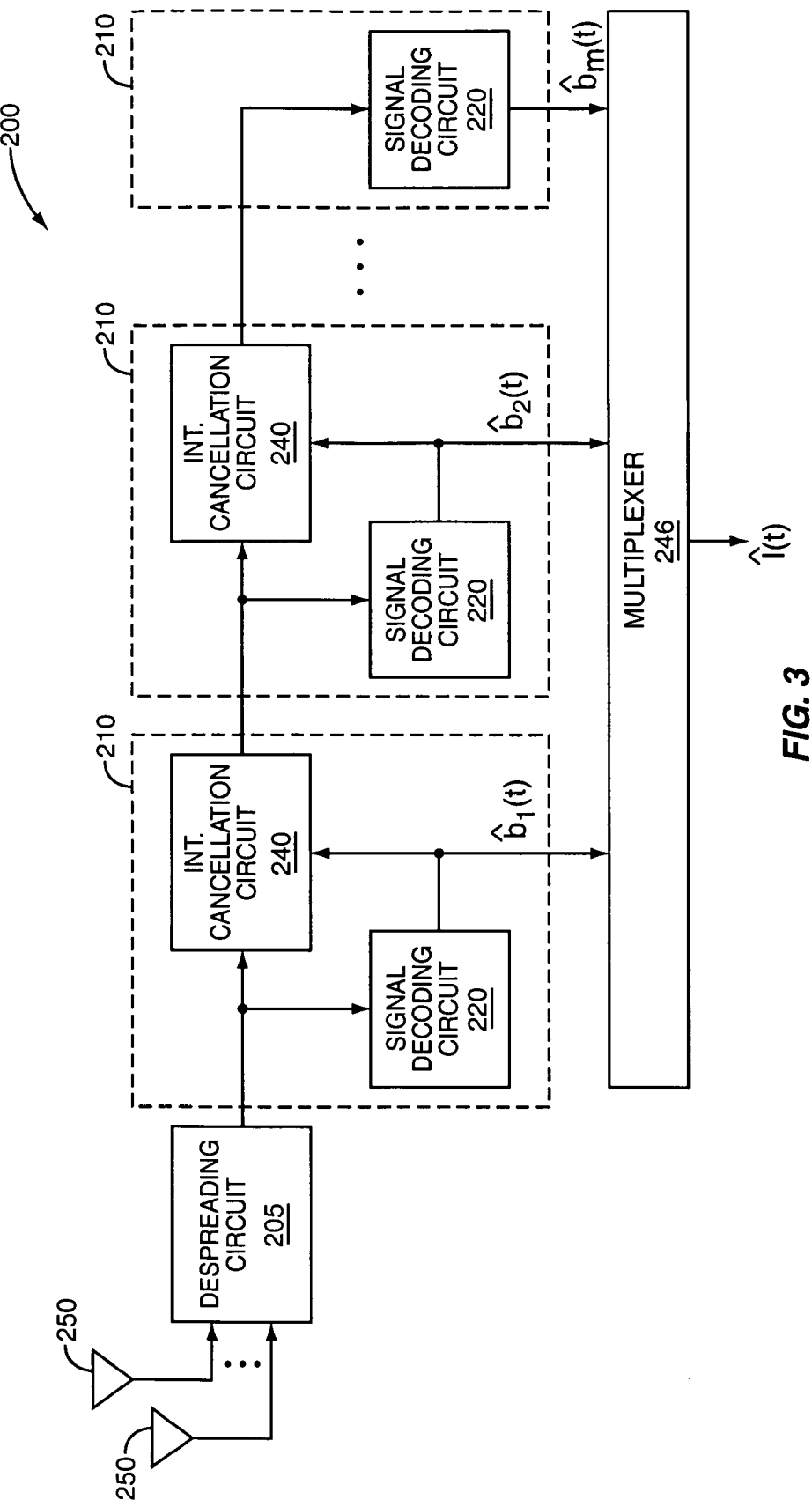
FIG. 3 illustrates an receiver for a MIMO communication system in a first exemplary embodiment.

FIG. 3 illustrates an exemplary SIC receiver 200 for a MIMO system 10. The SIC receiver 200 comprises a despreading circuit 205 and a plurality of decoding stages 210. The despreading circuit 205 despreads the received composite signal from each receive antenna 250. The despreading unit 205 shown in FIG. 4 may be used as a despreading circuit 205 in the SIC receiver 200. The received composite signal at each receive antenna 250 comprises M signals of interest transmitted from M transmit antennas 150. Each decoding stage 210 decodes one signal of interest transmitted from a respective transmit antenna 150. The selection of the decoding order is either signaled by the base station or predetermined based on a mobile station's most recent feedback. Multiplexer 246 combines the decoded signals output from each signal decoding stage 210 to produce an estimate Î(t) of the original serial information stream I(t).

The despread signals output from the despreading circuit 205 are input to the first signal decoding stage 210. The input for each successive signal decoding stage 210 is provided by the previous signal decoding stage 210. Each signal decoding stage includes a decoding circuit 220 and an interference cancellation circuit 240. The decoding circuit 220 decodes one of the signals of interest. Thus, the number of signal decoding stages 210 equals the number of used transmit antennas 150. The interference cancellation circuit 240 in each decoding stage 210 except for the last decoding stage 210 cancels the decoded signal from the input signal for that signal decoding stage 210 to generate an input signal for the next signal decoding stage 210. Thus, decoded signals are successively cancelled in each signal decoding stage 210 until only one signal of interest remains by the time the last signal decoding stage 210 is reached. The input signals for the first M−1 stages will be composite signals, while the input signal to the last decoding stage 210 contains a single signal of interest, which may be corrupted by residual inference attributable to the previously detected signals of interest that was not completely removed by the previous interference cancellation.

Figure 4:
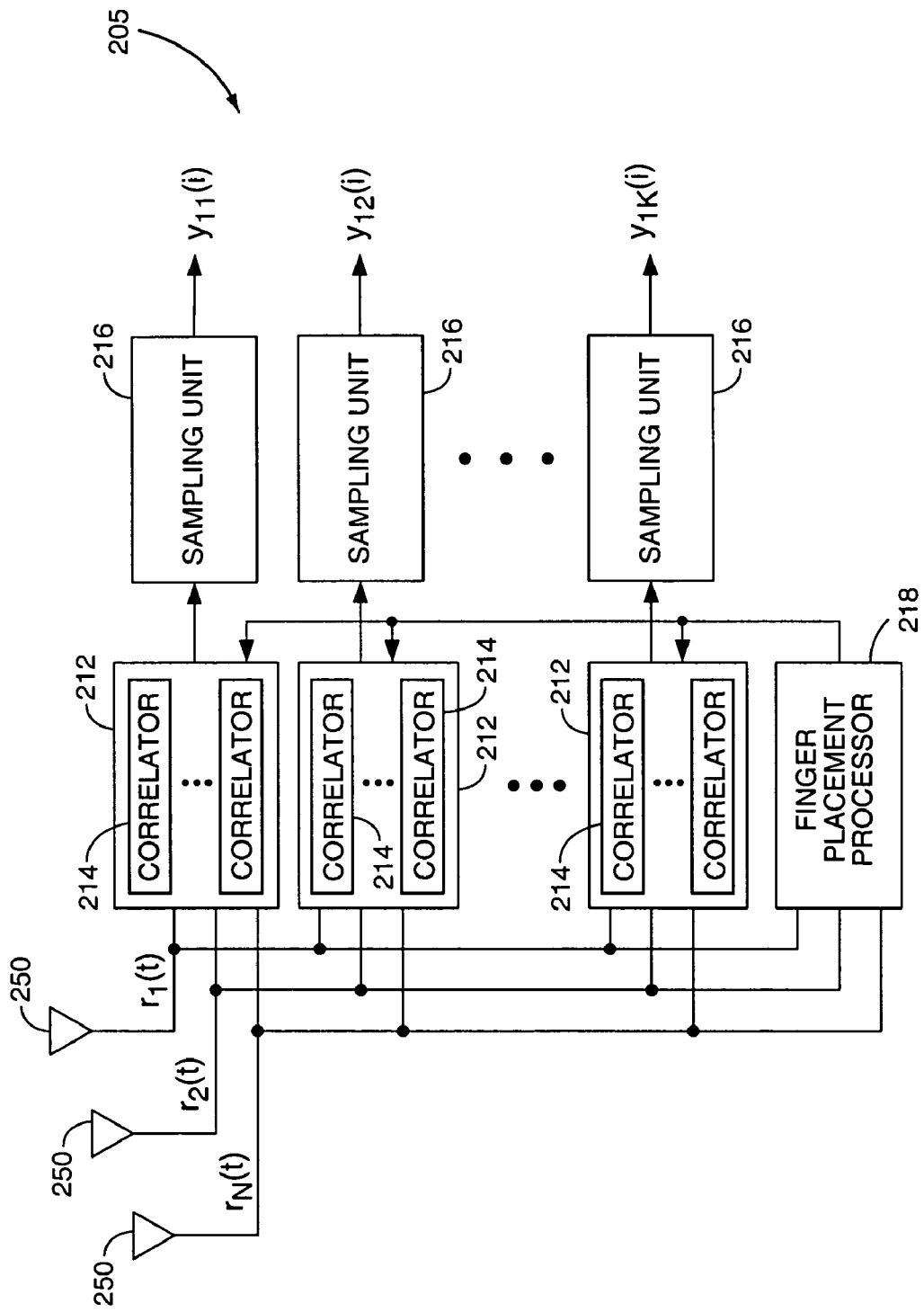
FIG. 4 illustrates an exemplary despreading circuit for the receiver.

FIG. 4 illustrates an exemplary despreading circuit 205 for the receiver 200. Despreading circuit 205 comprises a plurality of correlator banks 212 and a plurality of sampling units 216. Each correlator bank 212 comprises a plurality of correlators 214, also known as RAKE fingers, tuned to one of the K spreading codes and spanning the multiple receive antennas 250. A finger placement processor 218 selects the finger delays of the RAKE fingers comprising each correlator bank 212 in the same manner as a conventional single-antenna GRAKE receiver. For example, finger placement processor 218 may place the RAKE fingers to maximize the signal to interference plus noise ratio (SINR) at the output of the GRAKE combining circuit 222. The RAKE finger outputs are then sampled at the symbol intervals by sampling units 216 to generate a plurality of despread vectors denoted $y_{mk}(i)$ at each $i^{th}$ symbol interval. The subscript k indicates the code channel and the subscript m indicates the $m^{th}$ stage of the SIC receiver. For the first stage (m=1), the despread vector $y_{mk}(i)$ represents a composite of M coded signals transmitted from M transmit antennas 150 over the $k^{th}$ code channel.

Figure 5:
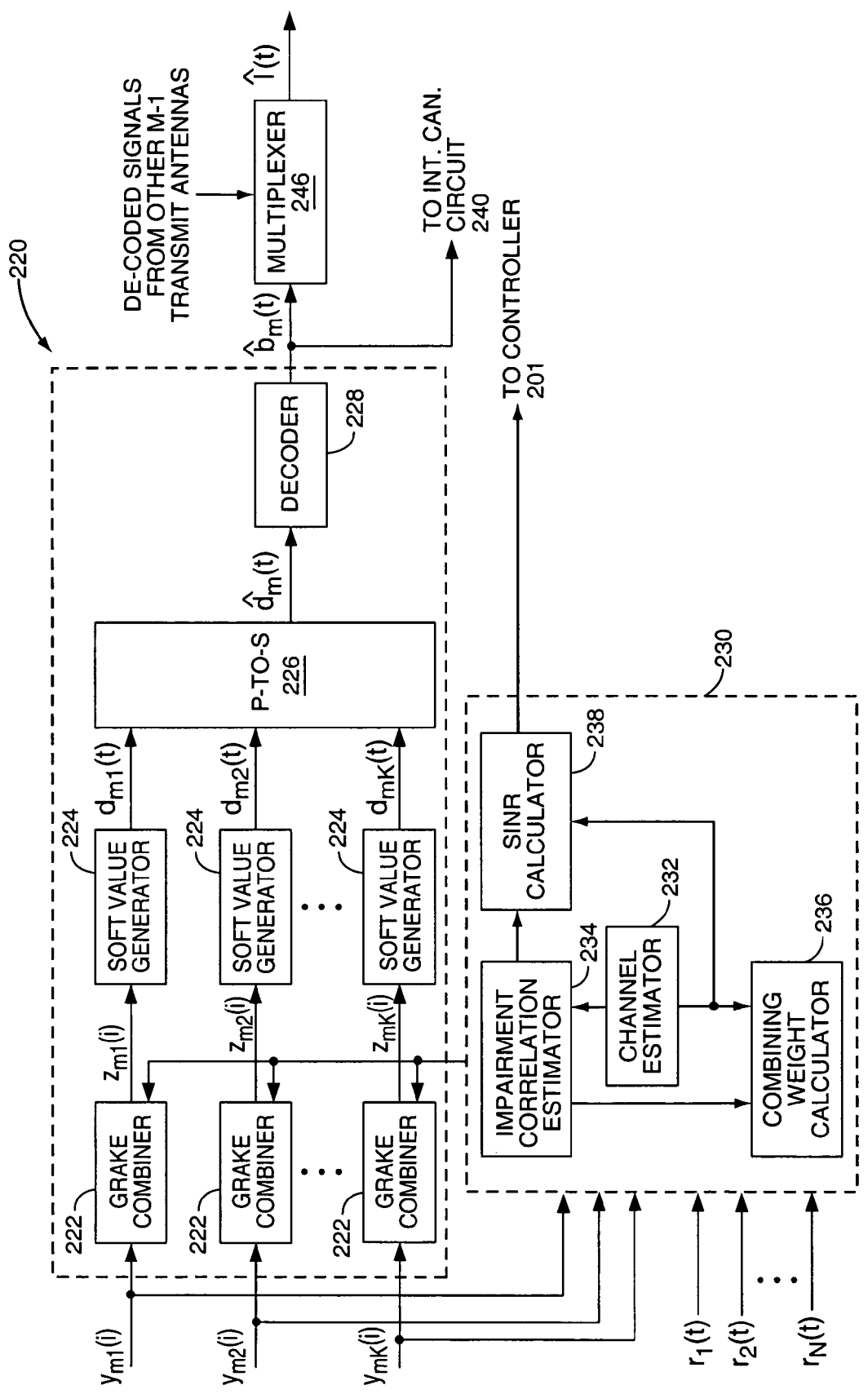
FIG. 5 illustrates an exemplary signal decoding circuit for the receiver.

FIG. 5 illustrates an exemplary decoding circuit 220 for the $m^{th}$ stage. In what follows, it is understood that the $m^{th}$ stage is associated with the $M^{th}$ transmit antenna 150 of the particular antenna subset selection used by the transmitter 100. The exemplary decoding circuit 220 uses GRAKE combining which takes into account code impairment correlations and possibly code cross-correlations, but could also use conventional RAKE combining. The decoding circuit 220 comprises K GRAKE combiners 222, each of which are matched to the $m^{th}$ antenna, K soft value generators 224, a parallel to serial converter 226, and a decoder 228. There is one GRAKE combiner 222 and one soft value generator 224 for each of the K code channels. Each GRAKE combiner 222 combines the despread vector $y_{mk}(i)$ using a combining weight vector $w_{mk}(i)$ to generate a GRAKE output signal $z_{mk}(i)$ that corresponds to one of the data substreams. Each soft value generator 224 generates a stream of soft values $d_{mk}(t)$ corresponding to the coded bits.

The combining weight vector $w_{mk}(i)$ is computed by a RAKE processor 230. RAKE processor 230 comprises a channel estimator 232, an impairment correlation estimator 234, a combining weight calculator 236, and an SINR calculator 238. Channel estimator 232 generates channel estimates for the impairment estimator 234 and combining weight calculator 236. The impairment correlation estimator 234 calculates impairment correlations that are used by the combining weight calculator 236 based on the channel estimates and spreading codes. The combining weight calculator 236 determines the combining weights based on the impairment correlations provided by the impairment correlation estimator 234 and the channel estimates provided by the channel estimator 232. The combining weight vector $w_{mk}(i)$ for the $m^{th}$ transmit antenna 150 and the $k^{th}$ multicode is given by:

$$w_{mk}(i) = R_{ym}^{-1}(k,i) h_{mk}(i), \quad (1)$$

where $R_{ym}(k,i)$ is the impairment covariance matrix for the $m^{th}$ stage and $h_{mk}(i)$ is the net response vector of the channel from the $m^{th}$ transmit antenna 150. The impairment covariance matrix $R_{ym}(k,i)$ takes into account cross-correlations between spreading codes used to spread the data substreams $d_{mk}(t)$ to reduce intersymbol interference (ISI) and multiple access interference (MAI) due to code reuse. In the embodiment shown in FIG. 5, the impairment covariance matrix $R_{ym}(k,i)$ is different for each decoding stage 210 due to the successive interference cancellation. The net response vector $h_{mk}(i)$ will also vary for each transmit antenna 150 making the RAKE combining weights different for each transmit antenna 150. The SINR calculator 238 estimates the SINR for one or more transmission modes as hereinafter described based on the impairment covariance matrix $R_{ym}(k,i)$ and net response vector $h_{mk}(i)$. In the above descriptions, the net response, impairment covariance, and hence combining weights, are all functions of the desired symbol's spreading code. One can also average out the desired symbol's spreading code and obtain a net response, an impairment covariance, and combining weights that are not code-specific.

The GRAKE output signals $z_{mk}(i)$ are supplied to respective soft value generators 224. Each soft value generator 224 receives a corresponding GRAKE output signal $z_{mk}(i)$ and generates soft values $d_{mk}(t)$. The soft values are input to parallel-to-serial converter 226 which converts the parallel soft value streams into a single serial soft value stream $\hat{d}_m(t)$. The composite soft value stream $\hat{d}_m(t)$ is input to a decoder 228 to obtain a decoded bit stream $\hat{b}_m(t)$ corresponding to the signal of interest transmitted from the $m^{th}$ transmit antenna 150. A second parallel-to-serial converter 246 functions as a multiplexer. Parallel-to-serial converter 246 receives the decoded bit streams $\hat{b}_m(t)$ for all transmit antennas 150 and outputs an estimate $\hat{I}(t)$ the original information stream $I(t)$.

In MIMO systems, it is not always beneficial to transmit to a mobile station 14 using all available transmit antennas 150. In some circumstances, it may be better to transmit data to the mobile station 14 using less than all transmit antennas 150. Some improvement may be realized by selectively changing the number of transmit antennas 150. The process of determining the number of transmit antennas 150 to use is referred to herein as mode selection. The term transmission mode as used herein refers to the number of transmit antennas 150 or streams that will be used to transmit information to the mobile station 14. In the case of PARC, there is a one-to-one correspondence between the number of transmit antennas 150 and streams. The transmission mode is designated herein as mode n, where n is the number of transmit antennas 150. Thus, mode 2 refers to a transmission mode using two transmit antennas 150. For a transmission mode that employs less than all available transmit antennas 150, the "best" subset of transmit antennas 150 should be chosen for transmitting data to the mobile station 14. One interpretation of "best" is the subset of transmit antennas 150 that maximizes the data transmission rate. The process of determining the subset of transmit antennas 150 to use is known as antenna selection. A MIMO transmission scheme having selectively changeable transmission modes is referred to as selective MIMO.

Mode selection and antenna selection may be performed by the controller 101 at the base station 12, the controller 201 at the mobile station 14, or divided between the base station controller 101 and mobile station controller 201. If both mode selection and antenna selection are performed at the base station controller 101, the mobile station controller 201 would need to feedback the SINR for all possible antenna combinations for all possible modes. Alternatively, the mobile station controller 201 may feedback a channel quality indication (CQI), which is essentially a quantized SINR obtained by mapping the SINR at the mobile station 14 to a corresponding CQI value. The amount of feedback is dependent on the number of transmit antennas 150 being used. For example, if the number of transmit antennas 150 equals four, the mobile station 14 would need to feedback one CQI for each of the four mode-1 antenna combinations, two CQIs for each of the six mode-2 antenna combinations, three CQIs for each of the four mode-3 antenna combinations, and four CQIs for the single mode-4 combination, resulting in a total of 32 CQI values.

The amount of feedback may be reduced by letting the mobile station controller 201 select the best combination of antennas 150 for each possible mode, and letting the base station controller 101 select the transmission mode. In this case, the mobile station controller 201 determines the combination of transmit antennas 150 for each transmission mode that maximizes the rate and feeds back the SINR or CQI for the selected antennas 150 for each mode. Continuing with the example of four transmit antennas 150, this approach requires that the mobile station controller 201 feed back one CQI for mode 1, two CQIs for mode 2, three CQIs for mode 3 and four CQIs for mode 4, for a total of 10 CQIs. In addition, the mobile station controller 201 would need to feed back the antenna selection for each mode.

The amount of feedback can be further reduced by constraining the antenna combinations for each lower order mode to be a subset of the antenna combinations for the higher order modes. This constraint is referred to herein as the subset property and is described in U.S. patent application Ser. No. 10/841,911 filed 7 May 2004, which is incorporated herein by reference. Continuing with the example of four transmit antennas 150, if antenna 3 is selected for mode 1, the mode 2 combination must include antenna 3. Thus, the possible mode 2 combinations include {1, 3}, {2, 3} and {4, 3}. Assume that the antenna selection for mode 2 is {1, 3}. The mobile station controller 201 is limited to considering antenna combinations for mode 3 that include antennas 1 and 3, namely {2, 1, 3} and {4, 1, 3}. For the highest order mode, the mobile station controller 201 needs to consider only one antenna combination. If the best antenna combination for mode 3 is {2, 1, 3}, then the mobile station 14 need only consider one antenna combination for mode 4, namely {4, 2, 1, 3}. If the mobile station controller 201 feeds back the antenna selection for mode 4, the base station 12 can deduce the antenna selection for the lower order modes. Thus, only one antenna selection indicator needs to be fed back to the base station 12. For reasons that will become apparent from the subsequent discussion, the antenna selection also denotes the decoding order.

The use of the subset property in the antenna selection has only a small impact on performance, but yields a significant reduction in feedback. Table 1 below gives the general form of the SINR for each stage in a SIC receiver 200 when the subset property is used assuming the above described antenna selections.

TABLE 1

| Mode | Antenna Selection | Stage 1 | Stage 2 | Stage 3 | Stage 4 |
|---|---|---|---|---|---|
| 1 | {3} | $\frac{S_3}{N}$ | | | |
| 2 | {1,3} | $\frac{\frac{1}{2}S_1}{\frac{1}{2}S_3+N}$ | $\frac{\frac{1}{2}S_3}{N}$ | | |
| 3 | {2,1,3} | $\frac{\frac{1}{3}S_2}{\frac{1}{3}(S_1+S_3)+N}$ | $\frac{\frac{1}{3}S_1}{\frac{1}{3}S_3+N}$ | $\frac{\frac{1}{3}S_3}{N}$ | |
| 4 | {4,2,1,3} | $\frac{\frac{1}{4}S_4}{\frac{1}{4}(S_2+S_1+S_3)+N}$ | $\frac{\frac{1}{4}S_2}{\frac{1}{4}(S_1+S_3)+N}$ | $\frac{\frac{1}{4}S_1}{\frac{1}{4}S_3+N}$ | $\frac{\frac{1}{4}S_3}{N}$ |

From the relation $S_3 \geq S_1 \geq S_2 \geq S_4$, which is a direct consequence of the subset property, it can re readily seen that the SINR for mode 1 is the largest, and that the first stage SINRs for the downlink transmission modes decrease monotonically when ordered from lowest to highest mode, as discussed further below. For mode 1, only a single data substream is transmitted from the transmitter 12 to the mobile station 14. Thus, the SINR is given by the power of the data signal from antenna 3, denoted $S_3$, divided by the noise power N, i.e., $S_3/N$. For mode 2, two data streams are transmitted from the transmitter 12 to the mobile station 14. The signals are decoded in reverse order of strength. Thus, in the first stage of the SIC receiver 200, the signal from antenna 1 is decoded followed by the signal from antenna 3. In the first stage of the SIC receiver 200, the signal from antenna 3 creates interference with the signal from antenna 1. Thus, for mode 2, the SINR in the first stage 210 of the SIC receiver 30 is given by:

$$SINR_1 = \frac{\frac{1}{2}S_1}{\frac{1}{2}S_3+N} \quad (2)$$

In the second stage 210 of the SIC receiver 200, the signal from antenna 3 is decoded; however, the signal from antenna 1 has been cancelled and does not contribute interference. Consequently, the SINR of signal from antenna 3 is given by:

$$SINR_2 = \frac{\frac{1}{2}S_3}{N} \quad (3)$$

The SINR in the second stage of the receiver 200 in mode 2 is the same as the SINR of the first stage in mode 1 with a scale factor applied to account for the fact that the transmit power is equally divided between two transmit antennas 150 in mode 2.

Similarly, three streams are transmitted from three antennas 150 in mode 3 and four streams are transmitted from four antennas 150 in mode 4. Following a similar reasoning, it can be shown that all of the SINRs, except the first stage SINR, for any given mode are related to the first stage SINRs for the lower order modes. This property is a direct consequence of forcing the antenna selections to obey the subset property. Thus, the mobile station 14 only needs to feed back the first stage SINRs for each transmission mode plus an antenna selection indicator that indicates the decoding order. The base station 12 can then construct the SINRs for each stage of each mode by simply scaling the first stage SINRs to account for the equal division of power across the number of antennas used for that mode. Subsequently, the base station 12 can then adjust the constructed SINRs for each stage according to the actual resource allocations and determine the transmission mode that supports the largest data rate.

If the subset property is used as described above, the feedback load is reduced to only four SINRs or CQIs and one antenna selection indicator. The decoding order is a permutation of M integers, and indicates the order in which the signals from the respective transmit antennas 150 should be decoded for each possible mode. Because there are M! possible decoding orders, the feedback of the decoding order requires cell(log2(M!))=5 bits (for the case of M=4).

In general, the scheduler at the base station 12 will favor users with the best channel conditions. Thus, users with favorable channel conditions will be far more likely to be scheduled than users with unfavorable conditions. Exceptions may occur, for example, if a fairness criteria is used to ensure that all users are served. There is little benefit in feeding back channel quality information from users not likely to be scheduled. Some channel quality feedback from users in unfavorable conditions, however, may be needed if users are to remain in contention for scheduling. In other scenarios, the cost of feeding back channel quality information may exceed the benefit, even for users with favorable conditions. For example, the channel quality information for the higher order transmission modes may not be beneficial if the expected increase in data transmission rate for the higher order transmission modes is negligible. In this case, a substantial reduction in feedback load may be realized by feeding back information only for the lower order transmission modes without any appreciable effect on performance.

According to one aspect of the present invention, a feedback control mechanism may be implemented by the controller 101 at the base station 12 to control the feedback load from the mobile stations 14. Feedback control may be implemented through use of a threshold that can be revised by the controller 101 at the base station 12 to control the feedback load. The threshold may be transmitted to the mobile stations 14 over a broadcast channel that is monitored by all of the mobile stations 14. Based on the threshold received from the base station 12, the mobile station 14 determines the amount of feedback to send to the base station 12. The mobile station 14 may send channel quality feedback for mode 1 regardless of channel conditions. Channel quality feedback for higher order modes is based on comparison of a performance metric to the threshold. Thus, feedback for the higher order modes is dependent upon current channel conditions.

In one exemplary embodiment, the mobile stations 14 always provide channel quality feedback for the single antenna transmission mode (i.e., mode 1). Whether the mobile station 14 sends feedback for the higher order transmission modes (i.e., transmission modes 2-M) depends on the threshold. For example, in one embodiment of the invention, the base station 12 sends an SINR threshold to the mobile stations 14. The mobile stations 14 sharing the HSDPA channel compare the SINR for the single antenna transmission mode to the SINR threshold. If the computed SINR for the single antenna transmission mode exceeds the threshold, the mobile station 14 calculates and feeds back the first stage SINRs for all possible transmission modes. If the SINR for the single antenna transmission mode is not exceeded, the mobile station 14 still feeds back the first stage SINR for the single antenna transmission mode to remain in contention for the shared downlink channel.

By revising the threshold, the base station 12 can control the total amount of feedback sent over the uplink so that only the users most likely to be scheduled feed back channel quality information for the higher order transmission modes. If the threshold is set high, only a few users will feed back channel quality information for the higher order transmission modes. As the threshold is reduced, more users will feed back channel quality information for the higher order transmission modes. The threshold may be set, for example, based on resource utilization and system capacity. When system load is light, the threshold may be set to a low value. On the other hand, when system load is heavy, the threshold may be increased to reduce the amount of feedback Because the SINR for the single antenna transmission mode is the largest SINR for all possible modes when the subset property is used in the antenna selection process, it is an appropriate metric to use for feedback control. If the SINR for the single antenna transmission mode is low, it is unlikely that the sum data rate for the higher order modes will be any greater than for the single antenna transmission mode. Consequently, there is little need to feed back channel quality feedback for the higher order transmission modes. However, by feeding back only channel quality information for the single antenna transmission mode, a user with poor channel conditions stays in contention for the shared channel. For example, a user with poor channel conditions may be the only one with data in his/her queue so that he/she may be scheduled despite the poor channel conditions. Also, a user with poor channel conditions may, nevertheless, be scheduled if a proportional fairness criterion is applied by the scheduling algorithm. Having the channel quality feedback for at least the single antenna transmission mode enables the base station 12 to schedule the user under such circumstances.

In another embodiment of the invention, the mobile station 14 may apply the SINR threshold to each mode greater than mode 1. Channel quality feedback is provided to the base station 12 for mode 1. The mobile stations 14 successively compare the first stage SINRs for the higher order modes to the threshold, and send channel information for each higher order mode when the first stage SINR exceeds the SINR threshold. For example, in the example with M=4 transmit antennas 150, the mobile stations 14 may provide channel quality feedback for transmission modes 1 and 2 in the case where the SINR threshold falls between the first stage SINR for transmission modes 2 and 3. Because the SINR for mode 3 did not meet the SINR threshold, the mobile station 14 would not need to compute the SINR for mode 4, thus conserving processing power at the mobile station 14.

In addition to the SINR threshold, the base station 12 also could broadcast a maximum mode indicator that informs the mobile stations 14 to only feed back the first stage SINRs for the transmission modes up to, and including, the value of the indicator if the SINR for the single antenna transmission mode exceeds the SINR threshold. For example, if the maximum mode indicator indicates mode 3, the mobile stations 14 would transmit channel quality feedback to the base station 12 for modes 1 through 3 if the SINR for stage 1 exceeds the SINR threshold.

Also, a rate increment threshold may be used in addition to, or in place of, the SINR threshold. The rate increment threshold specifies a minimum rate increase that must be satisfied before the mobile station 14 is allowed to transmit channel information for the higher order modes. As previously described, all mobile stations 14 provide channel quality feedback for the single antenna transmission mode. The mobile stations 14 may successively determine the expected rate increase for each additional transmission mode and send channel quality feedback only for those additional transmission modes that meet the rate increment threshold. For example, assume that the supportable data transmission rate for mode 1 is $R_1$, and the supportable data transmission rate for mode 2 is $R_2$, and the expected rate increase is $\Delta R_2 = R_2 - R_1$ or the ratio of $$\frac{R_2}{R_1}.$$

If $\Delta R_2$ meets the rate increment threshold, the mobile station 14 sends channel quality feedback for mode 2. The same process is repeated successively for each transmission mode beginning with mode 2 and ending with mode M.

Figure 6:
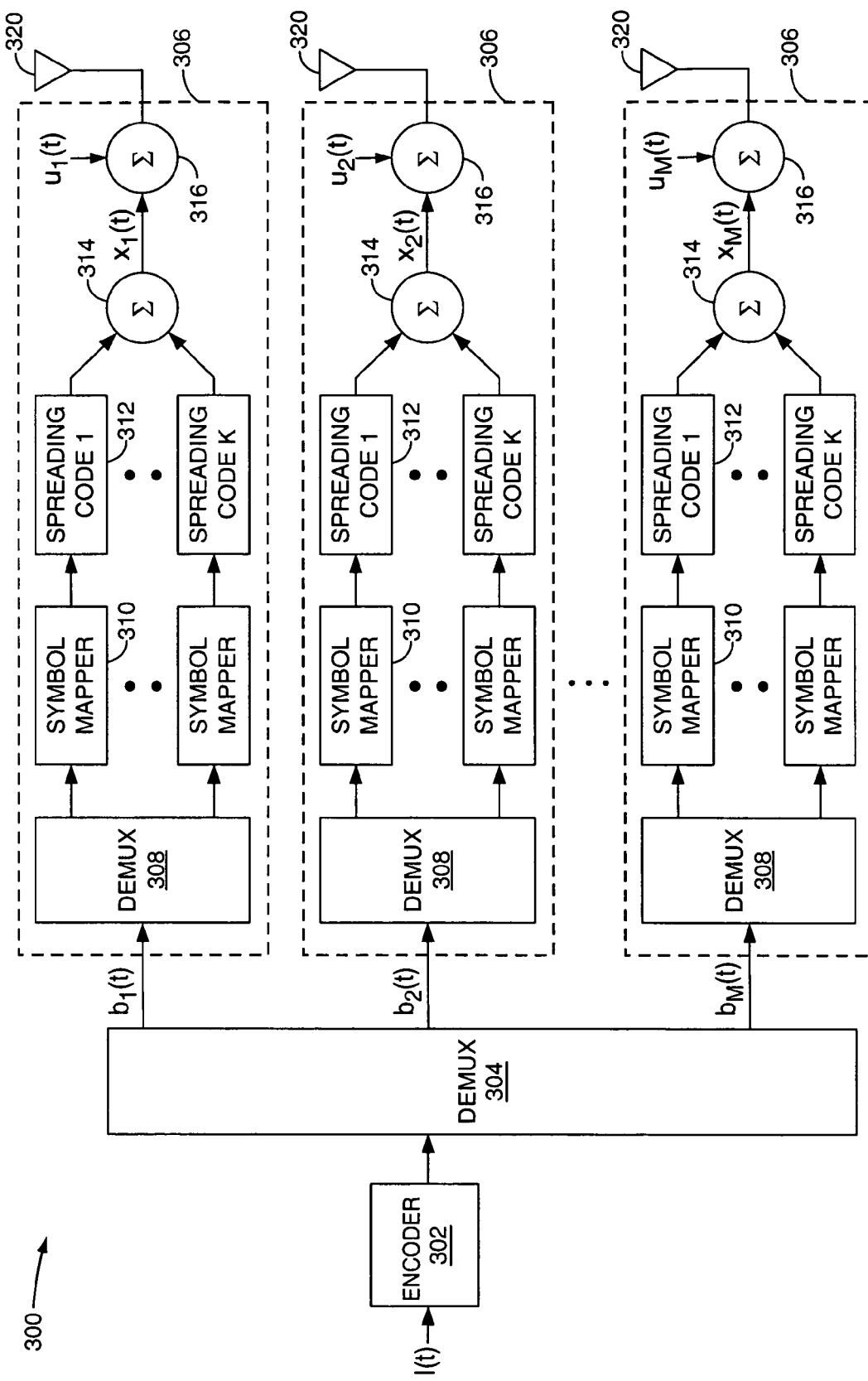
FIG. 6 illustrates a transmitter for a MIMO communication system in a second exemplary embodiment.
Figure 7:
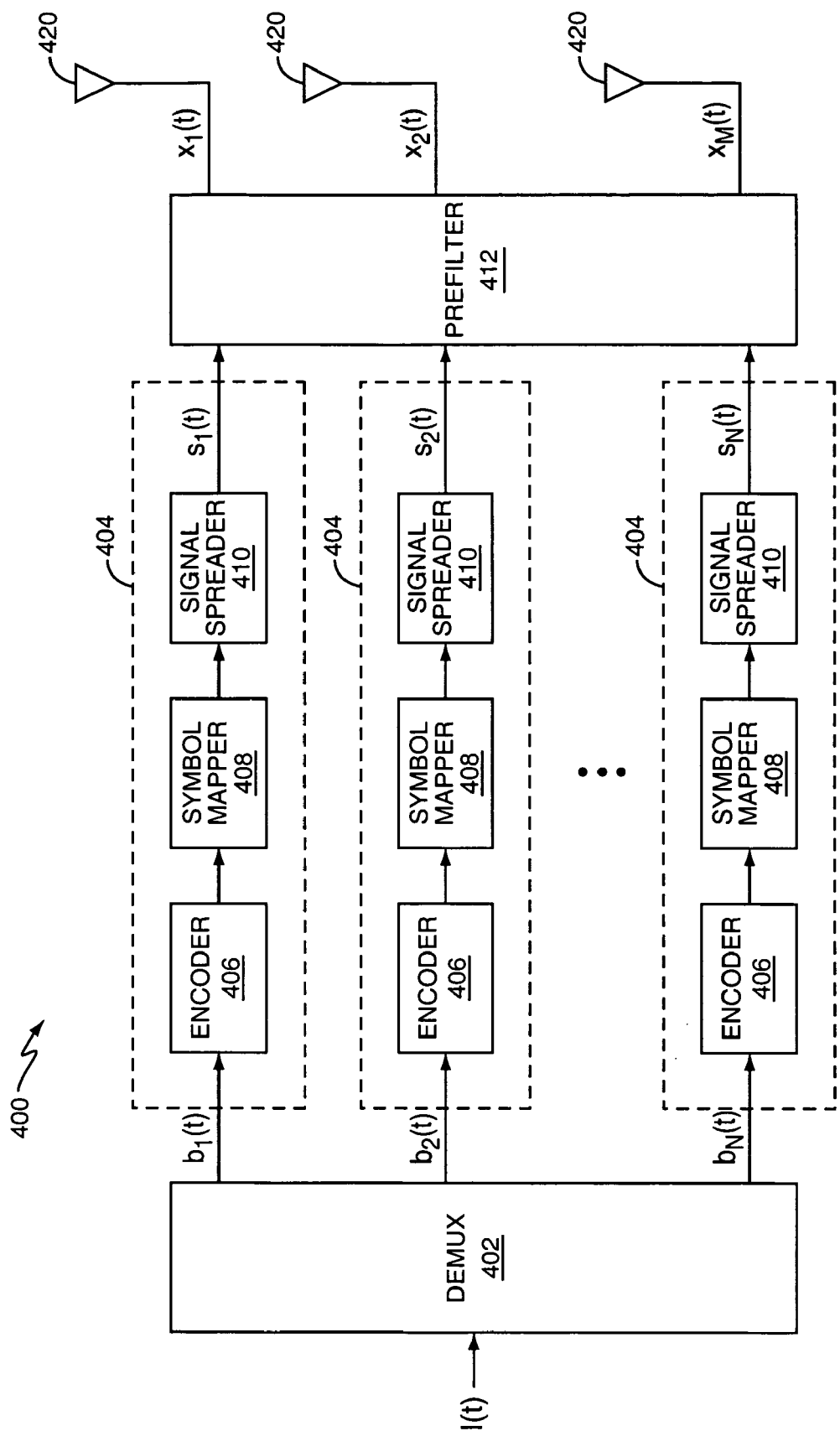
FIG. 7 illustrates a transmitter for a MIMO communication system in a third exemplary embodiment.

FIGS. 6 and 7 show two additional transmitter architectures which can be used in place of the PARC architecture. An SINR threshold or rate increment threshold could be also used with these transmitter architectures to reduce feedback.

FIG. 6 illustrates an exemplary transmitter 300 according to a second embodiment based on a spatial multiplexing (SM) architecture. In this embodiment. the input data stream is coded before it is split and the separate bitstreams are then independently modulated and transmitted. The transmitter 300 comprises an encoder 302 to encode the original information stream I(t) to generate a coded bitstream, a demultiplexer 304 to divide the coded bitstream into M bitstreams $\{b_1(t), b_2(t), \ldots b_M(t)\}$, modulation circuits 306 for each bitstream, and a plurality of transmit antennas 320. The modulation circuit 306 for each bitstream comprises a demultiplexer 308 to divide each coded bitstream into a number of substreams, a plurality of symbol mappers 310 to map each substream to a point on a signaling constellation, a plurality of signal spreaders 312 to apply a selected spreading code to each substream, and a combiner 314 to recombine the substreams to generate a transmit signal $\{x_1(t), x_2(t), \ldots x_M(t)\}$ for transmission to the second station 14. The transmit signals $\{x_1(t), x_2(t), \ldots x_M(t)\}$ may be further combined by combiner 316 with one or more other simultaneously transmitted signals $u_m(t)$ that contain a number of dedicated channels, control channels, as well as a common pilot channel. With the SM architecture, the transmitter can also adapt the number of bitstreams (mode) according to channel condition and the availability of radio resource. To support this, the mobile station 14 would need to signal back a channel quality corresponding to, for example, the supportable transmission data rate for each possible mode. According to our invention, channel quality feedback for higher modes is based on comparison of a performance metric to the threshold. Thus, feedback for the higher order modes is dependent upon current channel condition.

FIG. 7 illustrates an exemplary transmitter 400 according to a third embodiment based on a matched field transmit diversity (MFTD) architecture. The input data stream is transmitted from multiple transmit antennas 420 to receiver 200 with one or more receive antennas 250. The input stream is pre-filtered to match the channel between the transmit and receive antennas 420, 250. In this architecture, each stream is transmitted from all transmit antennas 420. The transmission mode corresponds to the number of streams or transmit signals. The pre-filter 412 is used to focus each transmit signal on a selected receive antenna 250.

The transmitter 400 includes a demultiplexer 402 to divide the information bitstream into a plurality of bitstreams, a coding and modulation circuit 404 for each bitstream, a pre-filter 412 matched to the communication channel between the transmitter 400 and the receiver 200, and a plurality of transmit antennas 420. Each coding and modulation circuit 404 includes an encoder 406 to encode a corresponding bitstream, a symbol mapper 408 to map the coded bits to modulation symbols, and a signal spreader 410 to apply a selected spreading code to each substream. The signals output from the modulation and encoding circuits 404 are the transmit signals $s_1(t), \ldots s_N(t)$ to be transmitted to the receiver 200, where N is less than or equal to the number of antennas 250 at the receiver 200. The transmit signals $s_1(t), \ldots s_N(t)$ are input to a prefilter 412. The prefilter 412 filters the transmit signals based on knowledge of the communication channel between the transmitter 400 and the receiver 200. The calculation of the pre-filters 412 is described in co-pending U.S. patent application Ser. No. 11/045,877 filed Jan. 28, 2005, which is incorporated herein by reference. The prefilter 412 outputs filtered signals $x_1(t), \ldots x_M(t)$ to the antennas 420 for transmission to the receiver 200. In this case, the value of N can be referred to as the transmission mode. The transmitter can adapt the transmission mode according to channel condition and the availability of radio resource.

For each transmit signal, the mobile station 14 needs to signal back a CQI corresponding to, for example, the supportable transmission data rate, as well as channel information needed for the pre-filter 412 to focus the transmit signal. According to our invention, channel quality feedback for determining the transmission data rate and channel information needed for the pre-filter 412 for higher modes are based on comparison of a performance metric to the threshold. Thus, feedback for the higher order modes is dependent upon current channel conditions.

While the above describes the invention as part of an antenna selection process, it will be appreciated that the present invention also works without antenna selection. For example, when the decoding order is chosen such that the SINRs increase from the first stage to the last stage, the present invention does not require antenna selection. According to this embodiment, the mobile station 14 can compare the SINR from the last stage, i.e., the SINR with the largest rate. When the SINR from the last stage does not exceed the threshold, mobile station 14 feeds back only one SINR (or a 1-bit indicator) to indicate to the base station to not schedule this mobile station 14.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A method implemented by a receiving station in a mobile communication network of controlling feedback load on an uplink channel, said method comprising:
providing channel quality feedback to a multiple antenna transmitting station for a first downlink transmission mode corresponding to a first antenna configuration;
generating a performance metric; and
if the performance metric exceeds a first threshold, providing channel quality feedback to said transmitting station for one or more additional downlink transmission modes.

2. The method of claim 1 wherein said performance metric is indicative of the expected performance in said first downlink transmission mode.

3. The method of claim 2 wherein channel quality feedback for each additional downlink transmission mode is sent if said performance metric is met.

4. The method of claim 2 wherein channel quality feedback for each additional downlink transmission mode up to a designated maximum mode is sent if said performance metric is met.

5. The method of claim 2 wherein providing channel quality feedback for one or more additional downlink transmission modes to said transmitting station comprises:
computing an expected rate increase for one or more additional downlink transmission modes; and
providing channel quality feedback for each additional downlink transmission mode for which the expected rate increase exceeds a rate increment threshold.

6. The method of claim 1 wherein generating a performance metric comprises generating performance metrics for one or more of said additional downlink transmission modes, and wherein providing channel quality feedback for one or more additional downlink transmission modes comprises providing channel quality feedback for each additional downlink transmission mode for which the corresponding performance metric meets said threshold.

7. The method of claim 1 wherein generating a performance metric comprises generating performance metrics for one or more of said additional downlink transmission modes, and wherein providing channel quality feedback for one or more additional downlink transmission modes comprises providing channel information for each additional downlink transmission mode for which the corresponding performance metric meets said threshold.

8. The method of claim 1 wherein said performance metric is one of a channel quality metric or rate metric.

9. The method of claim 8 wherein said performance metric comprises one of a signal to interference plus noise ratio and a channel quality indication.

10. The method of claim 8 wherein said performance metric comprises an expected rate increase from a first mode to a higher mode.

11. The method of claim 1 wherein said receiving station includes a plurality of successive interference cancellation stages and wherein said performance metric comprises a signal to interference plus noise ratio for a first stage of said receiving station when the receiving station is configured for the first downlink transmission mode.

12. A receiving station in a mobile communication network comprising:

a receiver to receive signals from a multiple antenna transmitting station;

a transmitter to transmit signals to the transmitting station; and a controller operatively connected to the receiver and transmitter for controlling the receiver and transmitter, said controller operative to:

provide channel quality feedback to the transmitting station for a first downlink transmission mode corresponding to a first antenna configuration;

generate a performance metric; and provide channel quality feedback for one or more additional downlink transmission modes to said transmitting station if the performance metric exceeds a first threshold.

13. The receiving station of claim 12 wherein said performance metric is indicative of the expected performance in said first downlink transmission mode.

14. The receiving station of claim 13 wherein the controller provides channel quality feedback for each additional downlink transmission mode if said performance metric is met.

15. The receiving station of claim 13 wherein the controller provides channel quality feedback for each additional downlink transmission mode up to a designated maximum mode if said performance metric is met.

16. The receiving station of claim 13 wherein the controller computes an expected rate increase for one or more additional downlink transmission modes, and provides channel quality feedback for each additional downlink transmission mode for which the expected rate increase exceeds a rate increment threshold if the first threshold is met.

17. The receiving station of claim 12 wherein generating a performance metric comprises generating performance metrics for one or more of said additional downlink transmission modes, and wherein providing channel quality feedback for one or more additional downlink transmission modes comprises providing channel quality feedback for each additional downlink transmission mode for which the corresponding performance metric meets said threshold.

18. The receiving station of claim 12 wherein generating a performance metric comprises generating performance metrics for one or more of said additional downlink transmission modes, and wherein providing channel quality feedback for one or more additional downlink transmission modes comprises providing channel information for each additional downlink transmission mode for which the corresponding performance metric meets said threshold.

19. The receiving station of claim 12 wherein said performance metric is one of a channel quality metric or rate metric.

20. The receiving station of claim 19 wherein said performance metric comprises one of a signal to interference plus noise ratio and a channel quality indication.

21. The receiving station of claim 19 wherein said performance metric comprises an expected rate increase from a first mode to a higher mode.

22. The receiving station of claim 12 wherein said receiving station includes a plurality of successive interference cancellation stages and wherein said performance metric comprises a signal to interference plus noise ratio for a first stage of said receiving station.

23. A base station in a mobile communication network comprising:

a controller configured to generate a feedback threshold based on conditions associated with a downlink channel for one or more remote stations; and a transmitter configured to transmit the feedback threshold to one or more of the remote stations to control an amount of channel quality feedback received at a multiple antenna transmitting station from the remote stations.

24. The base station of claim 23 wherein the controller generates the feedback threshold based on at least one of a system capacity and a resource utilization of the mobile communication network.

25. The base station of claim 23 wherein the transmitter is further configured to transmit a maximum mode indicator to one or more of the remote stations to control the amount of channel quality feedback received from the remote stations.

26. The base station of claim 23 wherein the transmitter is further configured to transmit a rate increment threshold to one or more of the remote stations to control the amount of channel quality feedback received from the remote stations.

27. A method for controlling an amount of channel quality feedback received at a base station from one or more remote stations in a mobile communication network, the method comprising:

generating a feedback threshold based on conditions associated with downlink channels between a base station and one or more remote stations; and transmitting the feedback threshold from the base station to one or more of the remote stations to control an amount of channel quality feedback received at a multiple antenna transmitting station from the remote stations.

28. The method of claim 27 wherein generating the feedback threshold comprises generating the feedback threshold based on at least one of a system capacity and a resource utilization of the mobile communication network.

29. The method of claim 27 further comprising transmitting a maximum mode indicator to one or more of the remote stations to control the amount of channel quality feedback received from the remote stations.

30. The method of claim 27 further comprising transmitting a rate increment threshold to one or more of the remote stations to control the amount of channel quality feedback received from the remote stations.

* * * * *

UNITED STATES PATENT AND TRADEMARK OFFICE
CERTIFICATE OF CORRECTION

| | | |
|---|---|---|
| PATENT NO. | : 8,249,518 B2 | Page 1 of 1 |
| APPLICATION NO. | : 11/254172 | |
| DATED | : August 21, 2012 | |
| INVENTOR(S) | : Grant et al. | |

It is certified that error appears in the above-identified patent and that said Letters Patent is hereby corrected as shown below:

On the Title Page, in Field (54), and Column 1, Line 1, in Title, delete "NETWORK CONTROLLED" and insert -- NETWORK-CONTROLLED --, therefor.

Title Page 2, in Field (56), under "OTHER PUBLICATIONS", in Column 1, Line 4, delete "Assilomar" and insert -- Asilomar --, therefor.

Title Page 2, in Field (56), under "OTHER PUBLICATIONS", in Column 1, Line 5, delete "Monteray," and insert -- Monterey, --, therefor.

In Column 1, Line 16, delete "Packet (HSDPA)" and insert -- Packet Access (HSDPA) --, therefor.

In Column 4, Line 59, delete "$M^{th}$" and insert -- $m^{th}$ --, therefor.

In Column 7, Line 40, delete "re" and insert -- be --, therefor.

In Column 10, Line 44, delete "embodiment." and insert -- embodiment, --, therefor.

Signed and Sealed this
Eighteenth Day of December, 2012

David J. Kappos
*Director of the United States Patent and Trademark Office*